Aug. 11, 1959  C. L. ASHBROOK ET AL  2,899,217
PIPE COUPLING DEVICE WITH PRESSURE ACTIVATED PIPE GRIPPING MEANS
Filed Dec. 31, 1954  3 Sheets-Sheet 1
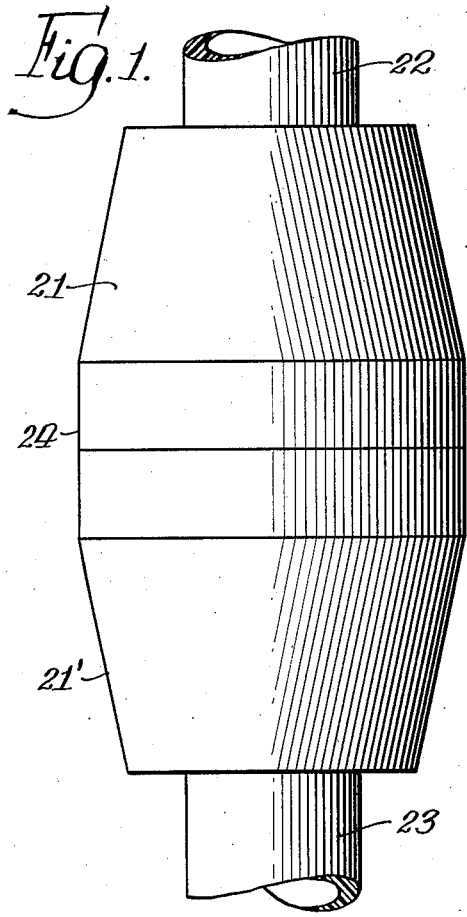
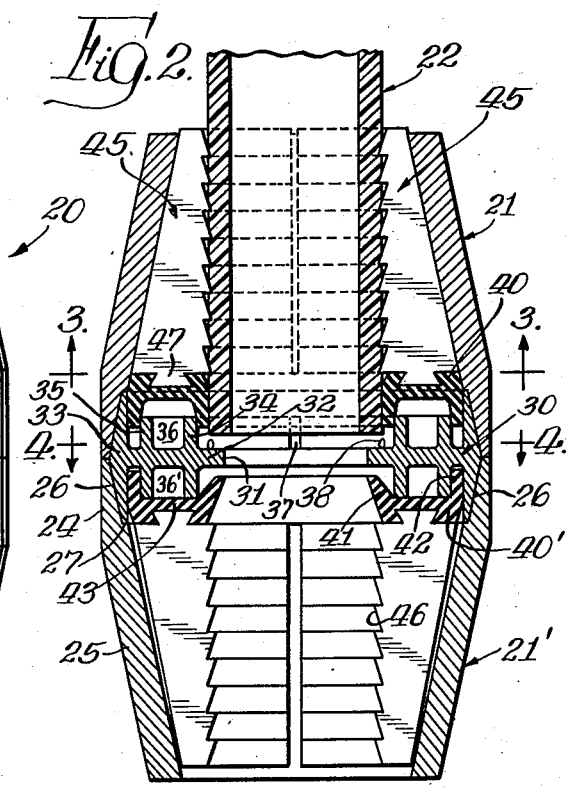
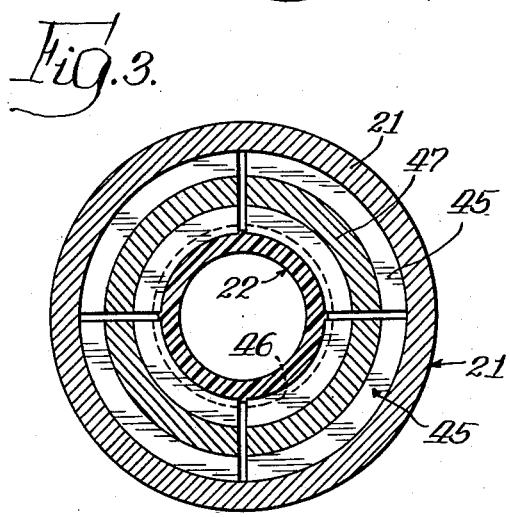
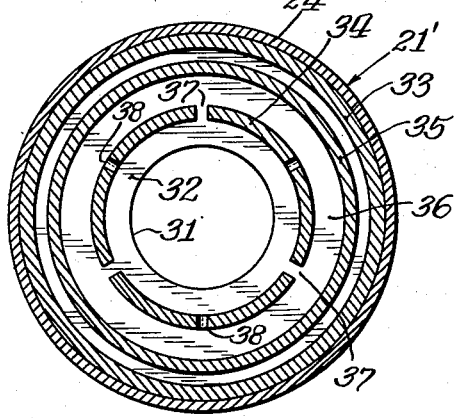
INVENTORS.
Clifford L. Ashbrook
Paul L. Peterschmidt.
By Brown, Jackson, Boettcher & Dienner
Atty's.

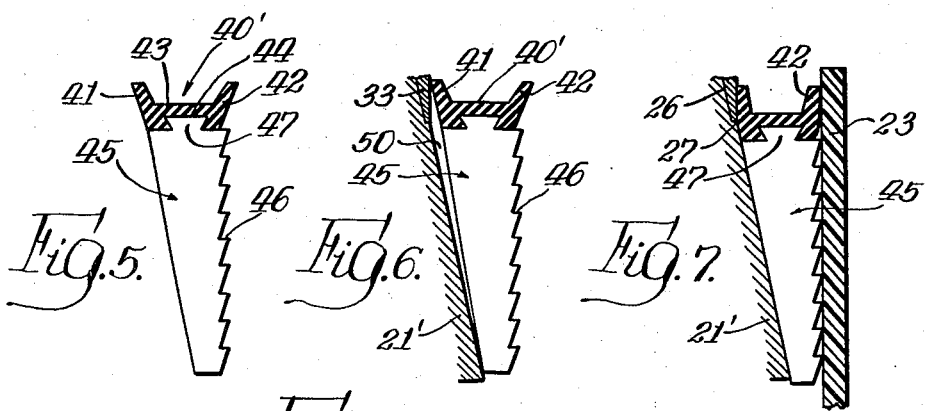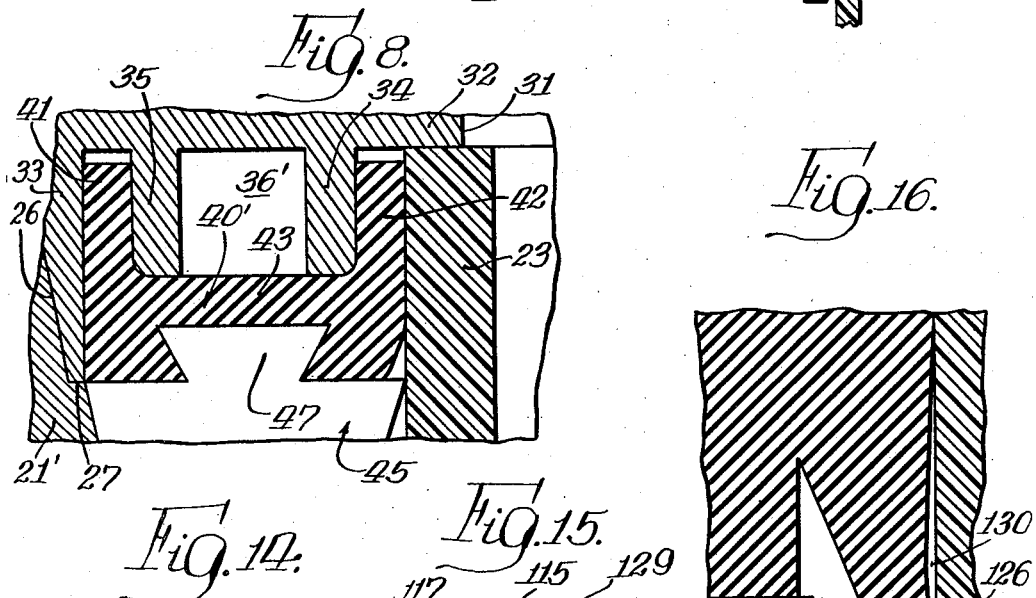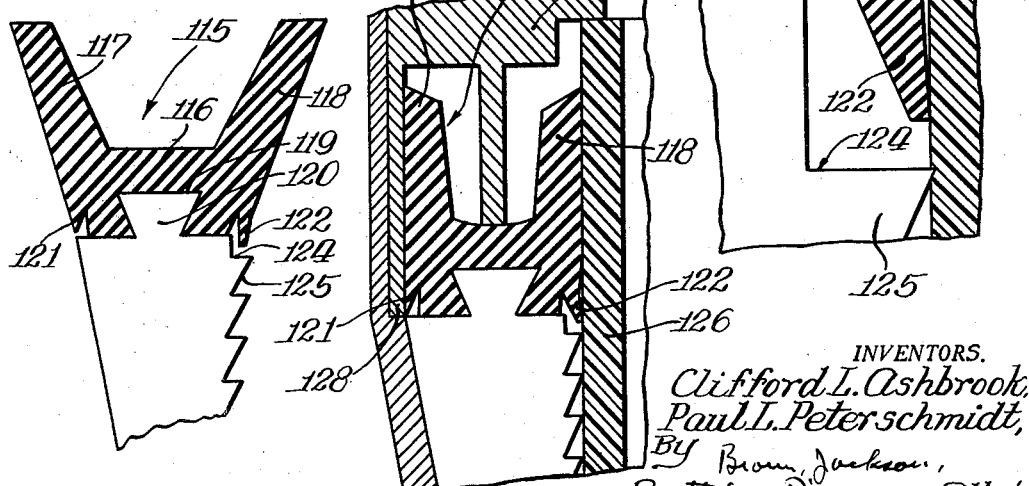

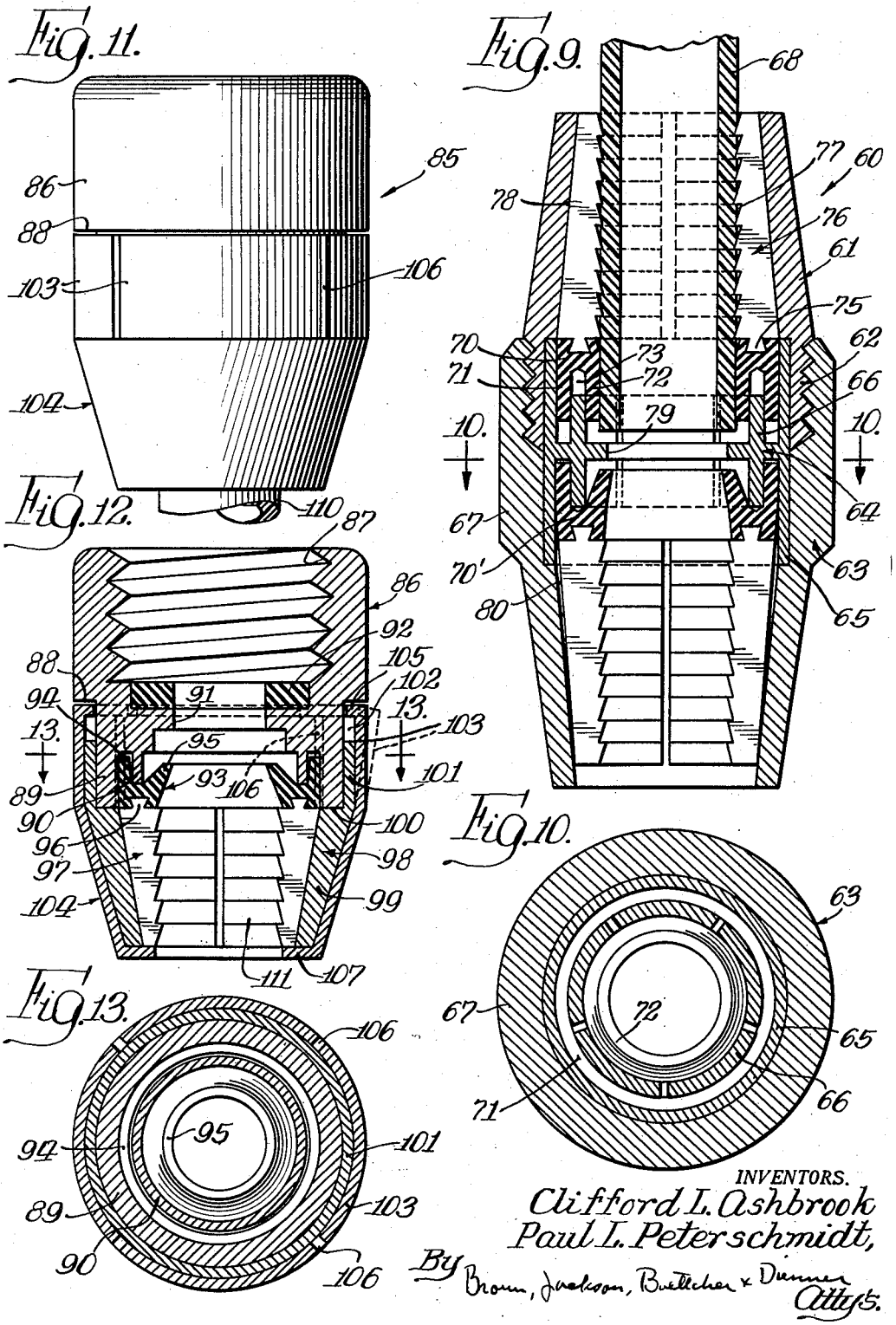

United States Patent Office 2,899,217
Patented Aug. 11, 1959

2,899,217

PIPE COUPLING DEVICE WITH PRESSURE ACTIVATED PIPE GRIPPING MEANS

Clifford L. Ashbrook, Houston, Tex., and Paul L. Peterschmidt, Park Forest, Ill., assignors to Henry T. Chamberlain, Evanston, Ill., trustee Application December 31, 1954, Serial No. 479,171

4 Claims. (Cl. 285—105)

This invention is directed to improvements in quick acting connectors for pipes, tubes and the like. More particularly the coupling device of this invention is directed to an improved, threadless, pressure activated fitting for coupling threadless tubular conduits or pipes.

The need for a successful, quick acting coupling device of the threadless variety for joining lengths of water pipe, gas pipe, tubing and like conduit members constructed particularly of synthetic or natural polymers and other plastics, is well recognized to those aware of this art. Especially desirable in a fitting or coupling device of this type is that it operate simply and effectively on the exterior of the pipe to assure a positive junction of the pipe or tube lengths joined and to provide a sealed junction capable of holding gas and liquid under pressure. The demand for such a fitting has become increasingly pressing with the advent of newly presented plastic tubular products which require a threadless coupling for the most successful application.

It is to such a coupling device that the invention herein is directed.

Generally, this invention comprises a coupling device which bears an integrated gripping and air and liquid tight sealing mechanism which is pressure activated and coupled by merely inserting the pipe or tubing endwise into the fitting. The gripping and sealing action provded by the fitting is effective at negative, zero, and positive pressure heads to give increased and improved operating characteristics for this type of coupling devices. Further the gripping and sealing mechanism can be easily released and disconnected by either an integrated or separate release mechanism as will be discussed hereinafter. No mechanical pressure activating devices such as metal springs are necessary or required to produce an effective seal and grip at any operating head under which the tubing or piping is placed and the fitting is so designed and constructed that its several elements and portions may be interchangeable between various types of fittings constructed according to the principles of the present invention. Added advantage is presented when a synthetic or natural polymer plastic piping or a tubing other than metal is employed since no metal components are required or necessary to bring about successful application of the coupling principles of this invention. The design of the gripping and sealing mechanism is such as to allow the empty fitting automatically to be receptive of the piping or tubing without the aid of spreading or opening devices such as metal springs or clips or other mechanical expedients heretofore resorted to in the art.

The coupling of this invention depends by and large on the activation of its grip and sealing mechanism in response to the pressures of the liquid or gas being conveyed through the tubing. Thus it may be said that the coupling is pressure activated as to both its sealing and gripping functions. The structural aspects of the several elements and portions included therein lead to a generally cylindrical configuration which is capable of axially receiving ends of pipe sections or tubular lengths to be joined thereby. The fitting is also constructed to permit the toleration of significant differences in outside tube or pipe diameter and dimensions as well as out of roundness without seriously impairing the effectiveness of the gripping and sealing mechanism included therein. Generally speaking it may be stated that the device in its more general applications comprises a substantially tubular of cylindrical housing in which are disposed a plurality of pipe gripping slips or elements which are joined and activated with and by a pressure receptive gasket member of a monolithic design.

The main object of this invention is to provide a new and improved coupling device of the threadless pressure activated variety for use with tubular conduit members.

A further object of this invention is to provide a new and improved pressure activated coupling device for pipe and tubing which effectively grips and seals the tubular members joined thereby under positive, negative and zero pressure head conditions.

A further object of the invention is to provide a quick acting and releasing threadless coupler especially for use with smooth walled synthetic or natural polymer plastic tubular members.

A still further object of the invention is to provide a new and improved pipe coupling device which embodies features of construction and details of element arrangement whereby the same is capable of positively gripping and sealing tubular pipe members thrust axially thereinto in a new and improved manner.

A still further object of this invention is to provide a new and improved pressure activated, threadless pipe coupling which is economical to produce, simple to use and effectively dependable in operation.

The above and further objects, features and advantages of this invention will be recognized by those familiar with the art from the following detailed description and specifications of preferred, modified embodiments thereof illustrated in the accompanying drawings.

In the drawings:

Figure 1 is an elevational view demonstrating the exterior features of a preferred coupling device of this invention;

Figure 2 is a cross-sectional view taken substantially along the longitudinal center line of the device illustrated in Figure 1, showing the same operating with one of two pipe or tubular members to be connected thereby;

Figure 3 is a transverse cross-sectional view taken substantially along line 3—3 of Figure 2, looking in the direction of the arrows thereon;

Figure 4 is a transverse cross-sectional view, similar to Figure 3, taken substantially at line 4—4 of Figure 2 and looking in the direction of the arrows thereon;

Figures 5, 6 and 7 are schematic representations showing operational functioning of the improved sealing and gripping mechanism embodied in this invention;

Figure 8 is an enlarged partial cross-sectional view taken substantially at the mid-section of the Figure 1 device to illustrate the operational details of the improved sealing mechanism employed therein;

Figure 9 is a longitudinal cross-sectional view similar to Figure 2 illustrating the details and features of a first modified form of the coupling device of this invention;

Figure 10 is a transverse cross-sectional view taken substantially along line 10—10 of Figure 9;

Figure 11 is a full elevational view, similar to Figure 1, demonstrating the features of a second modified form of coupling device of this invention and comprising a quick release and female adapter fitting;

Figure 12 is a longitudinal cross-sectional view similar to Figures 2 and 9 showing the details and arrangement of elements for the adapter fitting of Figure 11;

Figure 13 is a transverse cross-sectional view taken substantially along line 13—13 of Figure 12;

Figures 14, 15 and 16 are enlarged schematic representations of a modified sealing gasket capable of being employed with the three forms of the device illustrated in the above listed figures.

In the drawings Figures 1-4, the features and concepts of this invention are set forth in relation to a preferred form of coupling device 20 especially utilized for interjoining near abutting ends of coaxially aligned plastic pipes or tubes. More particularly the coupling device 20 illustrated includes a two part outer housing consisting of two like shell members 21 and 21'. When mounted for joining two pipe sections 22 and 23 as illustrated, the unit or coupling 20 is disposed substantially coaxially of the longitudinal axes of such pipe sections (see Figure 1).

As illustrated best in Figure 2 each of the shell members 21 and 21' comprises a substantially frusto-conical monolithic or unitary member formed with an exterior cylindrical base wall portion 24 and a substantially frusto-conical side wall portion 25 defining an internal frusto-conical chamber or axial opening. The cross-section of the base wall portion 24 is reduced by a tapered or feathered wall section 26 terminating in an annular shoulder 27. The cross-section of the side wall portion 25 is substantially uniform as illustrated best in Figure 2 so that the interior configuration of each of the shell segments 21 and 21' presents a substantially frusto-conical inner camming surface. It will be seen that each of the shell members 21 and 21' is open ended and that the two are assembled with their base wall portions 24 coaxially abutting.

Mounted centrally within the two shell segments 21 and 21' and extending therebetween is an annular spacer ring member 30 having a central opening 31 and an annular base or web wall portion 32 which extends transversely of the major axis of the coupling and defines opening 31. An outer wall portion 33 is formed transversely to the web wall 32 and defines the outer radial limits of the ring member. Note that the outer wall 33 of the ring member is formed with a substantially triangular shaped cross section, as best seen in Figure 2, for the purpose of matingly engaging with and receiving the feathered or tapered wall portions 26 of the housing shell members 21 and 21'. Preferably both the shell members 21 and 21' and the ring member 30 are made of like plastic material so that the same three members may be unified by a solvent weld disposed between the mating faces of the wall portions 26 of the shell housing and the inclined faces of the outer wall portion 33 for the ring member.

The ring member 30 also includes a pair of radially spaced annular wall members 34 and 35 which lie transversely to the web wall 32 and radially inward of the outer wall 33. The annular wall members 34 and 35 extend equidistant from opposite sides of the web wall 32 to form two annular chambers 36 and 36' thus giving a completely symmetrical structure. From Figure 4 it will be noted that wall 35 is uninterrupted while wall 34 is provided with a plurality of slotted vent openings 37 for the purpose of transmitting pressure carried by the conduit or pipe members 22 and 23 to the chambers 36 and 36'. If desired, and as shown in Figure 2, the wall members 34 may be provided with small holes or apertures 38 in place of the vent slots 77 for transmitting pressurized fluid or gas to chambers 36 and 36'.

Arranged to snugly engage the protruding wall portions 34 and 35 to thereby cap over the chambers 36—36' are a pair of annular gasket members 40 and 40'. Each of these gaskets is a monolithic molded product preferably made of a material having sufficient resiliency to permit its deformable reaction to pressure. In detail, as shown best in Figure 5, the gasket members 40—40' each have a cross-section comprising a pair of angularly disposed annular lip or finger walls 41 and 42 which are concentrically related with respect to each other and are formed integrally with a substantially transversely related base wall portion 43. The base wall portion 43 is distinguished by a dovetail shaped annular groove 44 formed inwardly of its bottom or lower face.

Connected to each of the gasket members 40—40' are four slip segments or frusto-conical quadrants 45, 45. Such quadrants are substantially wedge shaped in cross-section as best seen in Figure 2 or 5-7 and bear a toothed or serrated inner face 46. In certain instances such serrated faces may be eliminated in favor of smooth walls, as in coupling metal pipe lengths. Each toothed wall 46 defines a substantially circular quadrant so that their assembly defines an axial bore receptive of the tubular or cylindrical exterior of a pipe inserted into the coupling. Note also that each of the slip segments 45 is formed with a projection 47 running along its inner end which is dovetail in cross-section for mating engagement with the dovetail groove 44 of its related gasket member 40 or 40' as the case may be. The interfitting of the dovetail grooves and projection means between the gasket and slip members provides a simple connective means for joining the slip segments and gaskets in unitary fashion. If desired, adhesive may be applied between the mating or engaging faces of the segments and gaskets to assist the holding action of the dovetail groove and projection fastening system illustrated. It will be appreciated, of course, that cross-sectional configurations for projection 47 and grooves 44 other than dovetail as illustrated or their reverse association with members 40 and 45 may be resorted to without violating the intents and purposes of such an interconnecting means.

In the assembly of a coupler 20 as described, a set of four slip segments 45 is mounted on each gasket or seal member 40, 40'. The assembled gasket and slip units are then fitted into the opposite ends of the ring member 30 so that the extending finger walls 41 of the gaskets extend into the annular spaces between the walls 33 and 35 of the ring member and finger walls 42 lie radially inward of the wall 34 as best shown in Figure 2. That is to say, the radially outermost finger wall member 41 of each gasket fits intermediate the wall portion 35 and the exterior wall 33 of the separating ring while the radially innermost finger wall 42 rests freely across and extends inwardly beyond the annular wall portion 34 of the separator ring member 33. The exterior housing shell members 21, 21' are then slipped axially into position over the assembled rings, gaskets and slips and a solvent or thermal weld connection made between the inclined faces of the wall 33 on the ring member and the matingly tapered wall portions 26 of the shell members as well as between the adjacent ends of the housing shells. When this is accomplished it will be regarded that the adjacent ends of the two shell segments abut one another and that the annular shoulders 27 thereof lie snugly against and engage the ends of wall 33 on the ring member.

With the elements of the coupling device 20 assembled in the relationship demonstrated best in Figure 2 of the drawings, the preferred form of coupling described is ready for the axial reception of the two pipe members 22 and 23. In the upper half of Figure 2 the slip members and related gasket 40 are shown in their gripping and sealing relationship with the inserted pipe member 22. The bottom half of the coupling of Figure 2, however, is shown with the several elements thereof in their normal position prior to the insertion of the pipe 23. The exact functioning and operation of the sealing and gripping mechanism prior and after the insertion of a pipe may best be understood by studying Figures 5, 6, 7 and 8 of the drawings.

In Figure 5 the gasket or seal member 40' and the serrated slips 45 are shown in cross-section as they appear before being assembled with the ring 30 of the coupling device. The finger walls 41 and 42 of the gasket are flared outwardly in this state. The web wall portion 43 of the gasket is specifically designed to present as large an area as possible between walls 41 and 42 to insure good pressure activation of the seal and gripping mechanism comprising the gasket member and serrated slips. The wall portions 41 and 42 are thin enough in cross-section to provide desired flexibility and conformity to eccentricities in surfaces engaged thereby, but at the same time the thickness of the wall 42, especially, is sufficient to provide the necessary rigidity for soundly gripping the tube or pipe walls to prevent leakage.

Of outstanding importance is the interconnection between the gasket and slip members which provides a unique cantilever support or mounting for the slip segments and brings forth new and improved operating results for this type of coupler. In addition to providing a resilient pivotal fulcrum support for the slip members, the interconnecting means between the slip segments and the gasket permits coaxial movement of each gasket and slip assembly as a unit or peripheral piston. The significance of this factor will be apparent more readily after considering Figure 6 of the drawings.

As seen in Figure 6, the gasket 40' and a slip 45 are shown in the position they assume after being engaged with the ring 30 inside of the housing shell members. It will be recognized that the radially outermost finger wall portion 41 of the gasket member is compressed slightly against and inwardly of the feathered wall 33 of the separator ring member 30. The inner lip portion 42 by way of contrast remains uncompressed to define an opening of a smaller diameter than the outside diameter of the pipe to be inserted therethrough. This compression action of wall 41 serves to pivot or tip the entire gasket member 40' radially inward causing the axially outermost ends of the slip members to diverge outwardly against the inside face of the surrounding shell member 21' to perform an automatic spreading operation. This function of automatically separating or spreading the outer ends of the slips is especially important in this class of coupler in that it is desirable to maintain the slips in a ready position for the insertion of the pipe ends. In the past, separate spring means and like mechanical means have been employed for this separating function, but with the introduction of the new and improved cantilever mounting of the slips and seal rings, as described and shown herein, all mechanical expedients such as springs and the like are no longer necessary. The automatic spreading feature is due largely to the interconnection between the slips and the seal rings and the resilient, yet sufficiently rigid nature of the finger walls or portions 41 which resists radial compression and causes the automatic tipping action described and shown in Figure 6. Note that this action results in the formation of a gap spacing 50 between the slips and shell 20'.

It is also important to notice, as mentioned above, that the diameter of the opening defined by the inward radial extent of the wall portion 42 is smaller than the diameter of the opening defined by the compiled walls or bore of the several slip sectors. This means that while the diameter of the bore opening defined by the several slips is sufficient to receive the outside diameter of the pipe being coupled, the diameter of the opening defined by the wall 42 is smaller than the outside diameter of such pipe. This relationship may better be understood by looking at the lower half of Figure 2. Because of this feature a second important function is gained through the cantilever mounting and interconnection of the slips and seal rings. This feature will be recognized best from Figure 7 and the upper half of Figure 2. As a pipe member, for example pipe member 22, is inserted into the opening defined by the internal toothed faces 26 of the slip elements, it eventually contacts the annular wall portion 42 of the seal ring 40'. Further axial insertion of the pipe member causes a gradual radial expansion or spreading of wall portion 42 which guarantees a positive hugging action between the pipe and the seal ring to produce a zero or non-pressure activated seal with pipe 22. A further and more important feature, however, is brought about by the responsive activity of the slip elements which take place as the wall portion 42 is so radially expanded. As the pipe member is moved past the wall portion 42 the entire upper end of the slip and seal ring assembly is moved radially outward to close the gap 50. This action in effect moves the lowermost or axially outermost ends of the slip elements radially inward toward the pipe member to cause the toothed faces 46 thereon to mechanically grip the outside or external surface of the pipe. The separator member, of course, serves to limit the axial insertion of the pipe member and to concentrically locate the wall portions 41 and 42 of the gaskets. As a result, the slips, gaskets and piping eventually assume the condition illustrated best in Figure 8 of the drawings wherein the wall portions 41 of the gaskets are tightly compressed between the outer wall 33 of the separator member and the wall portion 35 thereof and the innermost wall portion 42 is compressed between the outermost surface of the pipe and the innermost wall member 34 of the separator member.

The operation of a device as described and shown in Figures 1–8 of the drawings is such that when pressure carried within the piping or tubing 22 and 23 is transmitted to the base walls 43 of the two gasket members via chambers 36 and 36' and the vent openings 37, the two slips and gasket assemblies act as annular or peripheral pistons and are driven in opposite axial directions. As the slips are so driven increased wedging action caused by the tapered inner walls of the housing shells serves to drive the serrated faces of the slips into tighter gripping engagement with the pipes.

Of additional advantage in the coupling device 20 as described, is the provision of a means for insuring a positive seal when the pressure carried within the system constitutes a negative or below atmospheric value. This feature is brought about, as will be best understood by examining Figure 8, through the provision of the gasket's inner and outer finger wall portions 42 and 41 respectively and their cooperating relationship with the annular wall members 34 and 35 of the ring member. Under negative head conditions or suction, the outermost finger wall 41 is wedged into tight engagement with the outer wall 35 of the separator ring causing an increasingly positive seal therewith. Likewise the innermost lip or finger wall 42 is wedged tightly between the outside wall of the pipe 23 and the inner wall 34 of the separator ring; the negative head or vacuum within the pipe causing the gasket member to be drawn axially toward the center of the assembly. Any leakage which tends to pass between the pipe and the inside flap or lip wall portion 42 will cause such lip to be wedged tighter against the inside wall 34 of the ring 30 increasing its contacting pressure with wall 34 and thus preventing bypass or leakage. If the assembly is first subjected to pressure and then vacuum, the gaskets will be displaced axially outward during the pressure application to increase their wedging engagement with the pipe and inner surface of the outer shell fitting. This minimizes leakage under later vacuum conditions. In the event extreme pressures occur, the presence of walls 34 and 35 of the separator ring serve to hold the annular lip walls of the gasket tightly against the outside of the pipe and inside of the housing, respectively.

*First modified form*

In Figures 9 and 10 of the drawings a first modified form of the invention embodying the concepts and operation features as described hereinabove is illustrated. From this figure it will be recognized that the coupler 60 shown, differs only slightly from the device 20 first described. Specifically coupling 60 is designed to provide a fitting for use with corrosive resistant tubing made of such materials as Teflon, Kel-F or stainless steel without employing excessive amounts of this expensive material to produce the coupling.

The housing of coupling 60 comprises a male shell 61 which is preferably made of brass, steel or a similar metal alloy. Such male fitting is provided with a threaded inner end portion 62 for engagement by mating threads of a female shell 63. Naturally it will be understood that the male and female shell members 61 and 63 are threadingly interfitted as opposed to the solvent weld interconnection described in association with coupling 20.

An annular separator ring or section 64 differs somewhat from the corresponding member 30 employed in fitting 20 in that a radially outermost annular wall portion 65 thereof is considerably elongated over the corresponding wall portion 33 of the separator member 30. Additionally separator ring 64 is provided with but a single inner vented wall portion 66 as opposed to the double wall construction first described. The inner and outer wall members 66 and 65 respectively of the ring member 64 are of unlike size or axial extent as will be observed from Figure 9 with the outer wall 65 extending substantially the full length of a cylindrical hub portion 67 formed on the female shell of the housing. Preferably the ring member or section 64 is made of a corrosive resistant material similar to that employed for the pipe members 68 and gasket seals of the coupling.

A pair of annular gasket seal members 70 and 70' are provided as in coupler 20, the same being made of Buna-N rubber, Teflon, Kel-F or like resilient corrosive resistant material. Each gasket member is annular in configuration and is uninterrupted, similar to the seals in the first described coupling device. It will be appreciated that the gasket 70, for example, includes a pair of separated annular lip portions 71, 72 defining therebetween an annular chamber or separation area 73 which is arranged to receive and tightly hug the sides of the inner annular wall 66 of the separator. Interlocking projections and depressions such as the interlocking dovetail connector means 75 illustrated are again employed between the annular gaskets and the four slip sectors 76 with each of the gasket members. In this type of construction the slip sectors may comprise a material such as casehardened steel or brass which materially reduces the expense of the coupling and at the same time insures a strong and rigid material capable of tightly gripping the corrosive resistant tubing with which this type of coupling is employed. As before, each of the slip segments is formed with a toothed inner wall 77. The segments or sectors 76 of course comprise substantial conical quadrants having tapered outer walls 78 which are designed to fit snugly with the corresponding or matingly tapered inner walls of the housing shells 61 and 63.

As shown best in Figure 10, the separator member or ring member 64 and the two gasket members 70 and 70' are monolithic or uninterrupted to comprise complete annular members. An opening 79 is, of course, formed centrally of the ring member for the transmission of pressurized fluid or gases from the interior of the pipes to the gasket means to pressure activate the device as described hereinabove.

As in the device 20 first described, the coupling 60 employs the cantilever or end attachment of the several slip segments with the gasket members. In the lower half of Figure 9, the assembled slips, gaskets, housing and separator ring are seen prior to the insertion of a pipe to be joined by the coupler. In the normal assembled relationship of the elements, and prior to the insertion of a pipe such as pipe 68, the chamber 73 which exists between the wall portions 71 and 72 of the gasket means receives the projecting wall 66 of the separator ring. The innermost annular wall portion or lip 72 of the gasket is permitted to flare radially inwardly to assume a diameter smaller than the outside diameter of the pipe with which the same is to be engaged. In this condition then, the compression of the outermost wall 71 of the gasket serves to bias the innermost ends of the slip members radially inwardly and the outermost ends thereof radially outwardly with an action like that heretofore described and as illustrated diagrammatically in the Figures 5–7 of the drawings. That is to say, the resilient resistance to compression which is experienced by forcing the outermost wall portion 71 of the gaskets into the spacing between the inner walls 66 and the outer walls 65 of the separator member causes a slight gap or spacing 80 to be formed between the inner wall of the housing shells and the exterior surface of the slip segments. This action corresponds to the formation of gap 50 in coupler 20. Therefore, the slips are placed in a most advantageous position for the axial reception of pipes since the outermost ends thereof are automatically separated. Upon the insertion of the pipe member, such as pipe 68, into and beyond the opening 79 of the gasket so that the same approximately engages the web or base wall of the separator member, the innermost lip 72 of the gasket is forced radially outward, to reverse the pivotal action or movement of the slip segments which causes the same to be radially driven into gripping engagement with the external surface of the pipe. At the same time the inner ends of the slips and gaskets are forced radially outward to eliminate the gap 80 which normally exists between them and the housing shells. Application of pressurized fluid to the internal workings of the coupling serves to axially drive the slip segments outwardly or toward the opposite ends of the interconnected housing members 61 and 63 to increase the gripping action of the toothed surfaces 77 on the external surface of the pipe. As in device 20, the interconnection of the slips and gasket member causes cotemporaneous axial movement of the gaskets and slips. Note again that the provision of the inner annular wall 66 of the separator ring and the double lip formation of the gasket provides a convenient mechanism for insuring positive sealing action under positive, zero, and negative head operation.

*Second modified form*

In Figures 11, 12 and 13 of the drawings is illustrated an adaptation of this invention whereby a quick connector means constructed in accordance with the concepts heretofore outlined may be coupled with a threaded adapter fitting.

In particular the adapter fitting 85 illustrated in Figures 11, 12 and 13 comprises a threaded female coupler fitting 86 having internal threads 87 for the reception of a normal threaded end of a pipe or the like. The fitting 86 is formed with an inwardly set shoulder portion 88, an outer depending wall portion 89 and an inner depending wall portion 90 adjacent its lower end. A central opening 91 is formed through the adapter or threaded fitting 86 for the passage of fluid or the like through the coupler. In order to insure a seal with the threaded pipe which is received in the internally threaded fitting 86, a normal ring gasket 92 is provided adjacent the axially innermost end of the internal threads 87.

A monolithic resilient gasket 93 similar in most respects to the gasket 70 employed with fitting 60 is provided and formed with an outer lip wall portion 94 and an inner flared lip wall portion 95. A suitable recess or groove is provided for the reception of dovetail projection means 96 formed on four slip segment members 97 which are characteristically the same as heretofore described and used in the devices 20 and 60. A monolithic shell housing 98 having a lower frusto-conical wall portion 99 is provided with an internal shoulder 100 which abuttingly engages the lower end of the depending wall 89 formed on the female shell fitting 86.

An upper cylindrical wall portion 101 of the housing shell 98 concentrically receives and surrounds the outer depending wall portion 89 of the shell fitting 86 (see Figure 12) when the two members are interfitted. Preferably the shell member 98 is formed of a suitable plastic material of the same type as fitting 86 so that shell 98 and wall 89 may be rigidly joined in assembly as by solvent welding. Note in particular that the upper or axially innermost extent of the cylindrical wall portion 101 of the shell member 98 falls short of the inwardly set shoulder 88 of the female fitting 86. This results in an annular gap or space 102 which cooperates with arm portions 103 on a quick release sleeve 104 designed to be slipped over the exterior of the shell member 98. It will be understood that each of the arm portions 103 is formed with an inwardly extending finger 105 at its upper end which invade the gap 102. The quick release sleeve 104 is substantially monolithic with the exception of quartering slits 106 formed in its upper substantially cylindrical portion which defines the extending arms 103 thereof. The lowermost end of the quick release sleeve is further distinguished by an annular inwardly extending wall portion 107 which projects radially inward beneath the lower ends of the slips 97.

While the quick release sleeve 104 is monolithic as mentioned, the quartered slits 106 permit the expansion of its upper end so that it is possible to slip the quick release sleeve axially over the exterior of the shell housing portion 98 until the finger portions 105 thereof snap into the recess gap 102. Due to the axial extent of the recess gap 102 it is possible to move the quick release sleeve axially relative to the housing shell 98 for releasing the slips as will be described presently.

As in the devices heretofore described, the insertion of a pipe member, such as pipe 110 of Figure 11, into the axial opening defined by the toothed faces 111 of the slip elements causes a radial expansion of the lip portion 95 on the gasket member. This action tips the outer ends of the slips inwardly to drive the teeth of the slips into tight engagement with the exterior surface of the pipe. The opposite end of the coupling device is, as mentioned, designed to receive a normal threaded end of a pipe member to adapt the quick release and pressure activated features of the present invention with a normal threaded pipe.

The principal feature added to the device 85 of Figures 11, 12 and 13 which is not found in the other described forms of the invention, resides in the quick release sleeve 104 which slides axially relative to shell 98 as viewed in Figure 12. This permits pushing the slip segments axially inwardly of the coupling to effect their release of the pipe, it being understood that the segments are advanced axially outward of the coupling under pressure application. Specifically the quick release sleeve may be pushed axially over shell 98 because of axial extent of gap 102. Since the sleeve wall portions 107 engage the lower or outer ends of the slips, such axial retraction of the sleeve 104 serves to drive the extended slips inwardly to release the radial pressure or gripping action of the slips on the pipe. The operator may then easily pull the pipe out of the quick acting coupler. The major feature of this quick release mechanism is that it permits the disconnection of a coupling of this class without need for auxiliary disconnect equipment. In any of the devices described, release of the coupler may be brought about by pushing the slips axially inward toward the center of the coupler to thereby release the pipe from the grip of the serrated faces on the slip members.

From the above description of the three forms of this invention illustrated, it will be appreciated that a new and improved pressure activated threadless pipe coupling or connecting fitting has been presented. In conjunction with the negative head operation of the sealing mechanism described, special regard should now be had to Figures 14, 15 and 16 of the drawings wherein a modified form of sealing gasket is illustrated. From Figure 14 it will be seen that a gasket 115 therein illustrated is substantially identical to the gaskets heretofore described, for example gasket 70 of device 60 illustrated in Figure 9. That is to say gasket 115 includes a base wall portion 116, an outer wall or lip 117 and an inner wall or lip 118. A suitable annular depression 119 is formed for the reception of a dovetail or similar connective projection 120 of a slip member in the manner heretofore described and shown. The major distinction between gasket 115 and those previously described lies primarily in the provision of a pair of flap portions 121 and 122, which are formed adjacent the base or lower end of the major lip portions 117 and 118. These small flaps are formed by molding indentations extending around the perimeter of both the inside and outside diameters of the gasket adjacent the end thereof which engages or contacts the slip elements.

As shown in Figure 15, the relative position of such gasket components and the slips do not change appreciably from the situation displayed in Figure 14 when assembled in the fitting. Thus when a pipe 126 is inserted past the serrations of the slip members the flap element 122 is successfully protected by its positioning behind the toothed serrations of the slips so that in the final assembly as shown in Figure 16, element 122 lies in a hugging contacting relationship with the walls of the pipe. The two flap elements 121 and 122 are provided especially for guaranteeing a more positive action under negative head operation and while the gasket 115 is illustrated as employing only two such flap elements additional such members may be provided as required.

When gasket 115 is assembled with the pipe 126 in a coupler, the flap 122 especially lies in full contact with the pipe 126 while flap 121 lies in full contact with the outside wall 128 of the spacer ring 129, as illustrated. This full contact engagement of the two small flap portions is brought about largely because of the pivoting or cantilever flexing action of the slips and major sealing flanges 117 and 118 of the gasket member as has been described before. Obviously the full contacting relationship of the flap portions 121 and 122 will improve if the system is pressurized as in such condition the major gasket 115 is compressed so that the base 116 thereof is enlarged to bring the gasket into a more constricted area.

Under conditions of negative head or suction the air which normally would reside in the annular spacing provided by the serration 124 of the slip element will be at atmospheric pressure since such serrations are open to the atmosphere via the separating slits between the slip segments. Therefore, placing a negative head behind or above the gasket will cause the negative sealing flap 122 to be moved laterally outward to more tightly hug the exterior wall of the pipe and insure a more positive sealing function. Further note, as shown in Figure 16, that the normal condition of the flap 122 with respect to pipe 126 is such as to form a slight gap 130 therebetween. Under negative head conditions with the air in the spacing provided by the serration 124 at atmospheric, such atmospheric head will be greater than the negative head or vacuum condition existing in gap 130 as caused by any leakage which might occur between the gasket and the pipe 126. In that situation the flap 122 will be forced into increased engagement with the wall of the pipe to assure a more positive seal.

It is obvious, of course, that the modified form of gasket 115 may be used in any of the assemblies described and shown hereinabove and that the modification thereof comprising the two flap seal portions 121 and 122 which operate substantially alike, does not violate the major functioning and operation of the previous gaskets or sealing rings described in association with the illustrated embodiments.

From the foregoing it will be recognized that a new and improved quick acting pressure activated coupling device for joining tubes and pipes has been presented, While the invention has been described in association with a preferred and two modified forms, it is to be realized that numerous changes, modifications and substitutions of equivalents may be employed therein without necessarily departing from the spirit and scope of the invention involved. As a consequence it is not intended that the present invention be limited to the particular form and features of the devices described except as may appear in the following appended claims.

We claim:

1. A pressure activated pipe coupling of the class described, comprising, a housing having an axial opening defining a camming surface, a set of slip segments arrayed lengthwise within said opening, exteriorly complementary with said camming surface and defining a pipe receptive bore, a deformable annular seal connected to the inner axial ends of said slip segments for maintaining their array and providing a cantilever support therefor, said seal having inner and outer lip portions extending radially inwardly and outwardly of the internal and external surfaces, respectively, of said arrayed slip segments so that the outer annular lip portion is radially compressed by its engagement with said housing and the inner annular portion is radially expanded by the engaging passage of a pipe therepast, such radial compression causing responsive diverging movement of the outermost ends of said attached slip segments and the said radial expansion causing converging movement of the said outermost ends whereby said bore is normally convergingly receptive of a pipe and said slips are automatically engaged with said pipe as it is inserted axially into said bore.

2. A pressure activated pipe coupling of the class described comprising, a generally cylindrical housing having a frusto-conical chamber opening inwardly of its one end, a set of slidable slip segments complementing the frusto-conical walls of said chamber and defining a pipe receptive bore, deformative annular gasket means interconnected with the innermost ends of said slip segments, said gasket means having portions protruding annularly outwardly of the exterior of said arrayed slip segments and inwardly of said bore, the outward protruding portion of said gasket generating its radial compression when assembled with said housing to form a fluid tight seal therewith, such radial compression resiliently diverging the outermost ends of said attached slip segments for pipe reception, the inward protruding portion of the gasket means requiring radial expansion by and sealing engagement with a pipe inserted therethrough, such radial expansion resiliently converging the outermost ends of said slip segments for mechanically gripping said pipe, the application of pressurized fluid through said pipe motivating the interconnected gasket means and slip elements as a unit toward the converging end of said chamber to increase the grip of said segments with said pipe.

3. A pipe coupling device of the class described, comprising, a generally tubular housing having an axial opening defining a camming surface diverging generally inwardly from one end of said opening, a set of slip segments slidingly arrayed lengthwise within said opening and exteriorly complementing said camming surface, said segments defining a pipe receptive bore, deformative annular gasket means mounted within said housing and interconnected with the axially innermost ends of said segments, annular stop means limiting movement of said gasket means axially into said housing, and diverging annular wall portions formed on said gasket means defining the inner and outer radial boundaries thereof, one of said wall portions protruding radially beyond the exterior surface of the assembled slip segments and the other wall portion protruding radially inward of said bore formed thereby, whereby said one wall portion is compressed radially inward when said gasket is inserted into said opening and the other wall portion is expanded radially outward by the insertion of a pipe into said bore and through said gasket, such radial expansion of said gasket causing the outer ends of the slip segments attached thereto to responsively move radially inward and mechanically grip said pipe sufficiently to prevent its ready withdrawal from said bore.

4. The combination set forth in claim 3 in which said stop means comprises an annular ring member having means to limit insertion of said pipe into said bore and provided with openings for transmitting pressurized fluid carried in said pipe to a portion of said gasket means lying between the two said diverging wall portions thereof, the arrangement being such that said pressurized fluid acts on said gasket means and slip segments along an annular area substantially coextensive with the axially innermost ends of said segments to drive said segments and gasket means axially as a unit toward the converging end of said camming surface.

References Cited in the file of this patent

UNITED STATES PATENTS

| | | |
|---|---|---|
| 2,017,994 | Spang | Oct. 22, 1935 |
| 2,047,569 | Loomis | July 14, 1936 |
| 2,184,376 | Beyer | Dec. 26, 1939 |
| 2,384,360 | Allen | Sept. 4, 1945 |
| 2,387,410 | Roe | Oct. 23, 1945 |
| 2,449,795 | Stillwagon | Sept. 21, 1948 |
| 2,508,914 | Graham | May 23, 1950 |

OTHER REFERENCES

Ser. No. 293,149, Boissou (A.P.C.), published May 25, 1943.